US006978533B1

(12) United States Patent
Yamashita et al.

(10) Patent No.: US 6,978,533 B1
(45) Date of Patent: Dec. 27, 2005

(54) METHOD OF MANUFACTURING RARE EARTH-IRON BOND MAGNET

(75) Inventors: Fumitoshi Yamashita, Nara (JP); Yuichiro Sasaki, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 259 days.

(21) Appl. No.: 10/048,644

(22) PCT Filed: Aug. 7, 2000

(86) PCT No.: PCT/JP00/05273

§ 371 (c)(1), (2), (4) Date: May 21, 2002

(87) PCT Pub. No.: WO01/11636

PCT Pub. Date: Feb. 15, 2001

(30) Foreign Application Priority Data

Aug. 6, 1999 (JP) ................................ 11-223394

(51) Int. Cl.[7] ...................... H02K 15/00; H02K 15/14; H02K 15/16

(52) U.S. Cl. ......................... 29/596; 29/566; 29/602.1; 29/602.2; 29/732; 75/230; 148/101; 148/302; 264/112; 264/122

(58) Field of Search .............................. 29/596, 602.1, 29/732, 566, 602.2; 141/101, 302; 264/112, 264/122; 75/230; 148/101, 302

(56) References Cited

U.S. PATENT DOCUMENTS

| | | | | |
|---|---|---|---|---|
| 4,902,361 | A * | 2/1990 | Lee et al. | 148/302 |
| 5,149,477 | A * | 9/1992 | Yamashita et al. | 264/112 |
| 5,300,156 | A * | 4/1994 | Mohri et al. | 148/104 |

FOREIGN PATENT DOCUMENTS

| | | |
|---|---|---|
| JP | 5-94922 | 4/1993 |
| JP | 6-236807 | 8/1994 |
| JP | 10-32134 | 2/1998 |

OTHER PUBLICATIONS

J.F. Herbst et al., "Rare Earth-Iron-Boron Material: A New Era in Permanent Magnets", Ann. Rev. Mater. Sci., 1986, 16, pp. 467-485.

* cited by examiner

*Primary Examiner*—Carl J. Arbes
*Assistant Examiner*—Tim Phan
(74) *Attorney, Agent, or Firm*—Wenderoth, Lind & Ponack, L.L.P.

(57) ABSTRACT

A powder molded magnet manufactured by a method comprising the steps of: (1) forming a granular compound of diameter of not more than 250 μm with a rare earth-iron rapid-quenched flake, which has not more than 150 μm in diameter, being coarsely ground if necessary, and a binder, (2) dry-blending the granular compound with fatty acid metallic soap powder, (3) forming compressed powder from the granular compound dry-blended with the fatty acid metallic soap powder, by powder molding, and (4) heat-treating the compressed powder to a temperature higher than a thermally dissociating temperature of stabilized isocyanate.

14 Claims, 3 Drawing Sheets

METHOD OF MANUFACTURING RARE EARTH-IRON BOND MAGNET

CROSS-REFERENCE TO RELATED APPLICATION

This application is the U.S. National Phase under 35 U.S.C. 371 of International Application PCT/JP00/05273, filed Aug. 7, 2000, which claims priority to Japanese Patent Application No. 11-223394, filed Aug. 6, 1999.

TECHNICAL FIELD

The present invention relates to a method of manufacturing rare earth-iron bond magnet to form a down-sized thin-arc-shaped magnet with high density and dimensional accuracy. The magnet is used for producing magnetic field in a small DC motor to meet the requirements of higher output power and lower operating current.

BACKGROUND ART

In the prior art, an arc-shaped magnet used as a field magnet for a small DC motor has been formed mainly of ferrite sintered magnet and ferrite bond magnet, and partly of rare earth-iron bond magnet manufactured by extrusion molding.

Generally, an arc-shaped magnet used as a field magnet is disposed outside of an armature for a small DC motor. A thickness of conventional arc-shaped magnet was not less than 1 mm, no magnet having a thickness of less than 1 mm has been available. When a motor is down-sized, therefore, a motor can not maintain output power since a diameter of an armature must be made smaller. Especially, in case of ferrite magnet, whether it is sintered or bonded, output power of a motor shows remarkable decrease due to the downsizing because enough static magnetic field is not applied to a gap between a field magnet and an armature.

Therefore, a thin-arc-shaped rare earth-iron bond magnet is awaited to provide enough static magnetic field to a gap between an armature and the bond magnet in a small motor.

For down-sizing motors, however, following problems must be solved to manufacture a rare-earth arc-shaped magnet having a wall thickness of less than 1 mm used as a field magnet in a small DC motor.

(1) Poor toughness of a sintered magnet causes breakage or cracks easily. A magnet less than 1 mm thickness is, therefore, hard for being integrated into a motor.

(2) To produce a magnet by injection molding, a molding die cavity must be filled with injected magnetic compound composed of magnet powder and thermoplastic resin. It is difficult, however, to inject magnetic compound having much amount of magnet powder into a molding die cavity of less than 1 mm width.

(3) To produce a magnet by powder molding, a compressed powder is formed first, using magnetic compound composed of magnet powder and thermosetting resin, then heated to cure the compressed powder. It is difficult, however, in powder molding, to fill molding die cavity with the magnetic compound uniformly. Moreover, molding die itself would be damaged due to such a cavity of less than 1 mm width.

(4) To produce a magnet by extrusion molding, extruded magnetic compound composed of magnet powder and thermoplastic resin is cooled just after extruded from a molding die head in case of a magnet of less than 1 mm thickness, which easily causes deformation in the magnet. Therefore, it is hard to produce a magnet having a wall thickness of less than 1 mm and having dimensional accuracy which allows the magnet to be directly integrated into a motor.

(5) As a method for producing an arc shaped magnet thinner than 1 mm, a machining into less than 1 mm from more than 1 mm thickness may be a solution for a magnet originally formed by injection molding, powder molding or extrusion molding as above mentioned way through 2 to 4. However, machining will easily cause fine cracks, which will make it difficult to integrate the magnet into a motor like the case 1 of a sintered magnet.

Consequently, for the above mentioned thin-arc-shaped magnet, a method of suppressing deformation of magnet is shown in Japanese Patent Non-examined Laid-Open Publication No. H06-236807, disclosing a method of manufacturing comprising the steps of:

(1) filling a molding die with molten magnetic compound composed of magnet powder and thermoplastic resin; and (2) extruding magnetic compound while being cooled the temperature in the molding die below the melting point of thermoplastic resin to prevent deformation.

According to the method disclosed, for example, arc-shaped magnet having a thickness of 0.9 mm can be produced by extrusion molding with a deviation of ±30 $\mu$m using magnetic material composed of 95 wt. % of rare earth-iron melt-spun Nd—Fe—B alloy flakes and thermoplastic resin mainly composed of 12-nylon.

In this way, however, magnet characteristics decrease accordingly, compared with a compression-molded magnet, due to reduced volume of magnet powder included because molten thermoplastic resin must act as a carrier of magnetic compound. Furthermore, magnetic material in molding die must be cooled below the melting point of thermoplastics of magnetic compound and solidified in order to form an arc-shaped magnet thinner than 1 mm with dimensional accuracy of not more than 30 $\mu$m in thickness deviation. Therefore, the method has drawbacks of molding-die-wear and increase in energy consumption because stronger extruding force is required and extruding speed decreases.

Generally, so-called powder molded magnet includes 1.5–3.0 wt. % of resin and has magnet density of 5.9–6.1 g/cm$^3$. The magnet is produced using rare earth-iron melt-spun flakes (for example, true-density: 7.55 g/cm$^3$) and thermosetting resin (for example, epoxy resin true density: approx. 1.15 g/cm$^3$) to form a compressed powder by powder molding, followed by curing by heating thermosetting resin.

On the other hand, magnet density of injection molded or extrusion molded bond magnet is, generally, less than 5.7 g/cm$^3$, since much amount of thermoplastics (for example, 12-nylon true density: about 1.1 g/cm$^3$), at least 5 wt. %, is needed, which decreases magnet density. A magnetic characteristics of such a magnet is not preferable for a small DC motor to apply a powerful static magnetic field in the gap between an armature and a field magnet, compared with powder-molded magnet, since the characteristics depends only on magnet density.

Therefore, thin-arc-shaped powder molded magnet, with its higher magnet density and dimensional accuracy, has been demanded for a high power permanent magnet motor.

SUMMARY OF THE INVENTION

This invention has been devised in view of the above-mentioned prior art, aiming to provide a thin-arc-shaped magnet having thickness of less than 1 mm, with high performance for both dimensional accuracy and magnet density, to provide a gap between a field magnet and an armature of a small DC motor with strong static magnetic field, and its manufacturing method.

In other words, a magnet of this invention is manufactured by a powder molding method basically comprising the steps of (1) forming granular compound having a particle-diameter of not more than 250 μm, using binder and rare earth-iron melt-spun flakes having a diameter of not more than 150 μm and coarsely ground if necessary;

(2) dry-blending the granular compound with fatty acid metallic soap powder;

(3) forming a compressed powder with the granular compound dry-mixed with fatty acid metallic soap powder, by powder molding; and (4) heat-treating the compressed powder to a temperature higher than a thermally dissociating temperature of stabilized isocyanate.

More specifically, (1) the magnet powder comprises a rare earth-iron melt-spun flake including $RE_2TM_{14}B$ (RE denotes Nd and Pr, TM denotes Fe and Co) phase of not more than 300 nm, with specific coercive force Hci of 8–10 kOe and residual-magnetization of 7.4–8.6 kG;

(2) the binder comprises epoxy oligomer which is solid in room temperature and having an alcoholic hydroxyl group in its molecular chain, more specifically, a bisphenol type epoxy oligomer with softening point of 85–95° C.;

(3) curing agent comprises stabilized isocyanate consisting of one mol of 4-4' diphenylmethane diisocyanate and two-mols of methyl-ethyl-ketone oxime;

(4) grinding a solid-state block formed by wet blending organic-solvent solutions of those materials and rare earth-iron melt-spun flakes, and then classifying granulate in size.

Furthermore, the fatty-acid metallic-soap powder comprises 100 weight parts of granular compound to which 0.2–0.5 weight parts of calcium-stearate powder is added whose particle diameter is 5 μm or less. Especially, the granular compound is adjusted to have apparent density of 2.7–3.0 g/cm$^3$ and powder fluidity of 40–45 sec/50 g. A compressed powder having a plurality of arc-shaped sectional views is manufactured, if necessary, for a rare-earth bond magnet having a weight of not more than 0.5 g and the maximum thickness of less than 1 mm. The compressed powder is then heat-treated for not less than 2 minutes at 160–200° C. in the air.

DESCRIPTION OF THE PREFERRED EMBODIMENTS

Figure 1:
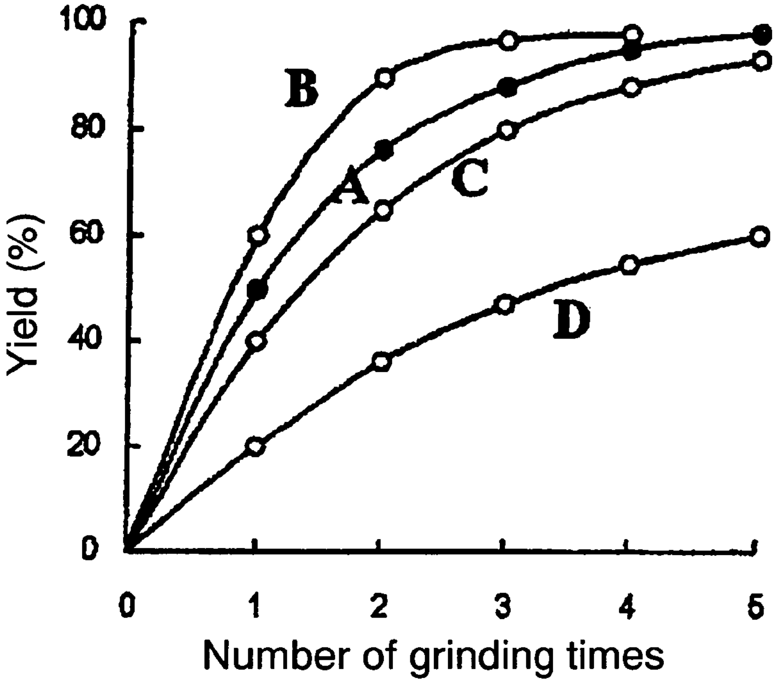
FIG. 1 is a graph showing a relation between a number of grinding times for granular compound having different particle-diameter upper limits and an yield.

This invention is aiming at providing a thin-arc-shaped magnet, for example, having thickness of less than 1 mm, with high dimensional accuracy and magnet density, to provide a gap between a field magnet and an armature of a small DC motor with strong static magnetic field and its manufacturing method.

Present invention discloses the fact that an upper limit of particle diameter of granular compound has great influence on dimensional accuracy of a thin-arc-shaped magnet when the granular compound is formed of a uniform mixture of (1) magnet powder of rare earth-iron melt-spun flakes, (2) a specific epoxy oligomer, and (3) a stabilized isocyanate.

Further, present invention discloses production conditions for the granular compound for a stable supply of a thin-arc-shaped magnet having thickness of less than 1 mm in an industrial level.

In other words, the magnet of the present invention is manufactured by a powder molding method basically comprising the steps of:

(1) forming a granular compound of not more than 250 μm in diameter with rare earth-iron melt-spun flakes having a diameter of not more than 150 μm, the flakes being coarsely ground if necessary, and binder;

(2) dry-blending the granular compound with fatty acid metallic soap powder;

(3) forming compressed powder by the granular compound dry-mixed with the fatty acid metallic soap powder, by powder molding; and (4) heat-treating the compressed powder to a temperature higher than a thermally dissociating temperature of stabilized isocyanate.

Especially, magnet powder comprises rare earth-iron melt-spun flakes including $RE_2TM_{14}B$ phase (RE denotes Nd and Pr, TM denotes Fe and Co) of not more than 300 nm, with specific coercive force Hci of 8–10 kOe and residual-magnetization of 7.4–8.6 kG. Binder comprises epoxy oligomer, solid at a room temperature, having an alcoholic hydroxyl group in its molecular chain, more specifically a bisphenol type epoxy oligomer with a softening point of 85–95° C. Curing agent comprises stabilized isocyanate consisting of one mol of 4-4' diphenylmethane diisocyanate and two mols of methyl-ethyl-ketone oxime. Pulverizing solid block formed of organic solutions of above materials and rare earth-iron melt-spun flakes in wet process, and following classification provide the granular compound.

Furthermore, fatty-acid metallic-soap powder comprises 100 parts by weight of granular compound to which 0.2–0.5 parts by weight of calcium-stearate powder is added whose particle diameter is not more than 5 μm. Especially, the granular compound is adjusted to have apparent density of 2.7–3.0 g/cm$^3$ and powder fluidity of 40–45 sec/50 g.

A compressed powder having a plurality of arc-shaped sectional views is manufactured, if necessary, for a rare-earth bond magnet having a weight of not more than 0.5 g and the maximum thickness of less than 1 mm. The compressed powder is then heat-treated for not less than 2 minutes at 160–200° C. in the air.

The rare earth-iron melt-spun flakes used in the present invention are, for example, is in "Rare Earth-Iron-Boron Materials; A New Era in Permanent Magnets" by J. F. Herbest in Ann. Rev. Sci. Vol—16. (1986). The flakes are produced by rapid solidifying a molten alloy containing Nd:Fe:B nearly at a ratio of 2:14:1, and heating properly to crystallize a $Nd_2Fe_{14}B$ phase. $Nd_2Fe_{14}B$ phase is acceptable if it has a single magnetic-domain critical sizes of not more than 300 nm. Magnetically isotropic flakes with residual magnetization Jr of 7.4–8.6 kG and specific coercive force Hci of 8–10 kOe are preferable.

However, it is also acceptable if the melt-spun flakes include, due to heat treatment, for example, alpha-Fe and nano-composite system including Fe3B type soft magnetism phase and $Nd_2Fe_{14}B$, and $Sm_2Fe_{17}N3$ type hard magnetism phase or the like.

On the other hand, epoxy oligomer having an alcoholic hydroxyl group in molecular chain and is solid at a room temperature such as bisphenol type epoxy oligomer and stabilized isocyanate are used to bind above-mentioned magnet fine particles with much stronger adhesion. As the stabilized isocyanate is an isocyanate compound added with active-hydrogen compound beforehand, the isocyanate group released by thermal dissociation reacts with an alcoholic hydroxyl group to cross-link by a urethane bond.

In this case, a part of released isocyanate group reacts with water adsorbed on magnet fine-particle (metal) surface, and form a substituted urea compound and make a chelate bonding with metallic-oxide surface. Furthermore, since thermal dissociation of stabilized isocyanate does not occur at a room temperature below 40° C., polymerization reaction with epoxy oligomer does not occur even if the stabilized isocyanate is uniformly mixed with epoxy oligomer. In other words, magnet powder containing granular compound can be adjusted to maintain the inactive condition which does not change powder-moldability after storage for several years.

The present invention is explained by following embodiments more in detail. However, this invention is not limited to the embodiments.

[Magnet Powder and its Coarse Grinding]

Magnet powder used in this invention is a product from Magnequench International In, Co. (Trade Mark: MQP-B), which is a rare earth-iron melt-spun flake with a thickness of 20–30 μm and having alloy composition of $Nd_{12}Fe_{77}Co_5 B_6$, and magnetically isotropic $Nd_2Fe_{14}B$ phase with crystal particles having a diameter of 20–50 nm. The magnet powder contains 39.7% particles in weight which passes 150 μm sieve at their initial conditions. Subsequently, 10 kg of magnet powder, not smaller than 150 μm, is ground at 1312 r.p.m. in a 20 liter Henschel mixer for 5 minutes in a nitrogen atmosphere.

Table 1 shows yield of magnet powder not greater than 150 μm and number of coarse-grinding time for magnet pressed powder formed by powder molding, pulverized powder not greater than 53 μm is seldom produced, as clearly shown in Table 1.

TABLE 1

| Particle Diameter (μm) | Number of Coarse Grinding Time: Initial | 1 | 2 | 3 | 4 |
|---|---|---|---|---|---|
| <53 | 3.44 | 1.58 | 1.00 | 1.91 | 1.12 |
| 53–75 | 9.49 | 3.77 | 2.39 | 4.37 | 6.61 |
| 75–106 | 18.92 | 8.98 | 5.77 | 9.10 | 12.77 |
| 106–125 | 28.07 | 20.65 | 15.92 | 20.10 | 21.85 |
| 125–150 | 39.69 | 51.62 | 37.91 | 40.50 | 49.09 |
| 150–250 | 85.73 | 99.00 | 99.60 | 99.58 | 99.51 |
| 250–350 | 99.79 | 99.98 | 100.0 | | |
| Yield (<150 μm) | 39.7% | 70.8% | 81.9% | 89.2% | 94.5% |

[Preparations of Binder Composition]

7 kinds of bisphenol type epoxy oligomers as shown in Table 2 and chemical formula 1, each having different melting point, and stabilized isocyanate which consists of one mol of 4-4' diphenylmethane diisocyanate and two-mols of methyl-ethyl-ketone oxime as shown in chemical formula 2 are dissolved in aceton to make an acetone solution of 50% concentration. The ratio between –NCO group of an stabilized isocyanate and sum of the alcoholic hydroxyl group in molecular chain of bisphenol type epoxy oligomer is specified as 0.8.

TABLE 2

| Sample | Degree of polymerization | Molecular Weight | Epoxy equivalent | Melting point |
|---|---|---|---|---|
| A | 0.1 | 380 | 190 | Liquid |
| B | 2.0 | 900 | 500 | 65–75 |
| C | 2.6 | 1060 | 650 | 75–85 |
| D | 3.7 | 1400 | 950 | 95–105 |
| E | 8.8 | 2900 | 2250 | 115–125 |

Chemical formula 1

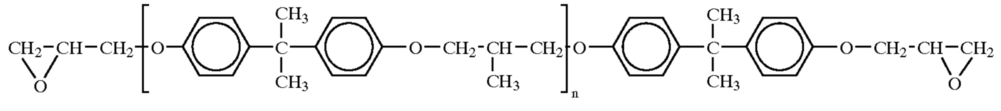

Chemical formula 2

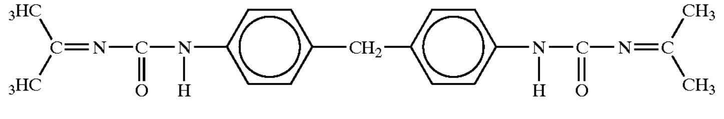

powder not smaller than 150 μm. As clear from the table, the yield reaches to not less than 90% by repeating coarse-grinding three times or more. Moreover, although too finely ground magnet powder causes a density decrease in com-

[Preparation of Granular Compound]

97.5 weight % magnet powder, not greater than 150 μm and 2.5 weight % acetone solution of epoxy resin are mixed in wet process using a sigma blade type kneader. Subsequently, the mixture is heated at 80–90° C. to evaporate acetone to obtain a solid block at a room temperature. The block is ground into granule by a cutter mill, and the granule is classified directly by sieves of 500, 350, 250, 212 and 150 μm respectively.

FIG. 1 shows a relation between a number of grinding times for granular compound and an yield, varying particle-diameter upper limit of 500, 350 and 250 μm respectively. Where, line A in the figure shows a relation between the number of grinding times and the yield for the granular compound having particle-diameter upper limit of 250 μm. The granular compound is formed by grinding a solid block comprising magnet powder, not greater than 150 μm as disclosed in the present invention, and epoxy resin using bisphenol type epoxy oligomer (melting point: 95–105° C.). On the other hand, lines B–D show a number of grinding times and yields for granular compound having particle-diameter upper limit of 500, 350 and 250 μm. The granular compounds are formed by grinding a solid block comprising magnet powder, in which 60.3 weight % of particles are not smaller than 150 μm (See Table 1) and epoxy resin using bisphenol type epoxy oligomer (melting point: 95–105° C.).

As is clearly shown in the figure, granular compound having particle-diameter upper limit of 250 μm, as disclosed in the present invention, can be obtained in good yield by using the magnet powder upper limit of 150 μm. Additionally, in the example explained below, magnet powder, not greater than 150 μm is used to form granular compound having the particle diameter upper limit of 250, 212 and 150 μm respectively.

[Effect of Fatty-Acid Metallic Soap]

The granular compounds, having the particle-diameter upper limit of 500, 350 and 250 μm each, are uniformly mixed with 0.2–0.6 parts by weight of fatty-acid metallic soap at a temperature below 40° C. with a V shaped mixer.

The effects of fatty-acid metallic soaps are evaluated on 100 parts by weight of granular compound having 250 μm of particle-diameter upper limit using bisphenol type epoxy oligomer (melting point: 95–105° C.) by adding 0.2–0.6 parts by weight of stearic acid, zinc stearate, calcium stearate, aluminum stearate, and magnesium stearate respectively. Consequently, calcium-stearate powder, not greater than 75 μm, shows preferable increase in fluidity of granular compound most, little change in apparent density after storage, and comparatively few reduction in radial crushing strength. On the other hand, calcium-stearate powder, not smaller than 75 μm is not suitable because it easily separates from granular compound. Stearic acid and zinc stearate are not suitable since both have lower melting points than the curing temperature (160° C.) and show, especially, large decrease in radial crushing strength.

[Melting Point and Moldability of Bisphenol Type Epoxy Oligomer]

Table 3 shows a relation between a melting point of bisphenol type epoxy oligomer and apparent density (JIS Z2504) and fluidity (JIS Z2502) of a granular compound having particle-diameter upper limit of 250 μm, which include 0.2 parts by weight of calcium-stearate powder as fatty-acid metallic soap. As shown in the table, the compound using the bisphenol type epoxy oligomer, liquid at room temperature, has poor fluidity. However, every granular compound using bisphenol type epoxy oligomer, which is solid at a room temperature, shows an acceptable powder fluidity for powder molding. Then, 1 kg of these compounds is calmly filled into steel containers with a bore of 50 mm respectively, and the apparent density and fluidity of each compound after 240 hours at 40° C. are investigated.

As a results, although bisphenol type epoxy oligomer, having the melting point of below 75–85° C., shows little change in fluidity, apparent density changes to 2.95–3.05 g/cm$^3$ from initial value of 2.75. In other words, bisphenol type epoxy oligomer having a melting point of higher than 95–105° C. is preferable for granular compound used in powder molding with high dimensional accuracy.

On the other hand, as to magnet density and radial crushing strength also shown in Table 3, bisphenol type epoxy oligomer with the melting point below 95–105° C. shows preferable results. Where, density (JIS Z2505) and radial crushing strength (JIS Z2507) are measured for bond magnet which is manufactured the following steps:

(1) filling an ring shape mold cavity having an outer diameter of 12.8 mm and an inner diameter of 10.5 mm with granular compound;

(2) applying pressure of 8 ton/cm$^2$ to form a compressed powder of 10 mm height; and (3) heating the compressed powder for 2 minutes at 160° C.

TABLE 3

| Melting temperature of oligomer (° C.) | Liquid | 65–75 | 75–85 | 95–105 | 115–125 |
|---|---|---|---|---|---|
| Fluidity (sec/50 g) | 57.2 | 44.1 | 41.3 | 40.9 | 40.5 |
| Apparent density (g/cm$^3$) | 2.23 | 2.75 | 2.75 | 2.85 | 2.85 |
| Magnet density (g/cm$^3$) | 6.1 | 6.0 | 6.0 | 6.0 | 5.9 |
| Redial crushing strength (kg/mm$^2$) | 5.04 | 4.87 | 4.67 | 4.76 | 3.67 |

[Curing Conditions for Bond Magnet]

Table 4 shows radial crushing strength at a room temperature on bond magnet manufactured by the following steps:

(1) Adding 0.2 parts by weight of calcium-stearate to 100 w/t parts of granular compound, having a particle-diameter upper limit of 250 μm, using bisphenol type epoxy oligomer (melting temperature: 95–105° C.);

(2) filling an ring shape molding die cavity having outer diameter of 12.8 mm and a inner diameter of 10.5 mm with the granular compound to form compressed powder of 10 mm height by applying compression of 8 ton/cm$^2$; and (3) heating the compressed powder for 2–20 minutes at 80–200° C.

Radial crushing strength becomes four times larger than compressed powder by heating for 2 min at, for example, 160° C. using a system comprising a bisphenol type epoxy oligomer and stabilized isocyanate which consists of one mol of 4-4' diphenylmethane diisocyanate and two-mols of methyl-ethyl-ketone oxime. In addition, the same level of radial crushing strength requires 20 minutes heating at 130° C. Therefore, preferable curing conditions for bond magnet of the present invention is to heat for more than 2 minutes at 160–200° C.

TABLE 4

| Time | Curing Temperature (° C.) | | | | | | | |
|---|---|---|---|---|---|---|---|---|
| (min.) | 80 | 100 | 120 | 130 | 140 | 150 | 160 | 200 |
| 2 | 1.17 | 1.74 | 2.68 | 2.82 | 2.40 | 4.42 | 4.81 | 4.85 |
| | (1.01) | (1.51) | (2.33) | (2.44) | (2.09) | (3.84) | (4.18) | (4.21) |
| 5 | 1.22 | 1.90 | 2.51 | 2.93 | 4.34 | 5.19 | 5.05 | 4.88 |
| | (1.06) | (1.65) | (2.18) | (2.54) | (3.77) | (4.51) | (4.39) | (4.24) |
| 10 | 1.33 | 2.29 | 3.04 | 3.27 | 4.99 | 5.65 | 5.59 | 5.17 |
| | (1.15) | (1.99) | (2.64) | (2.84) | (4.34) | (4.91) | (4.86) | (4.50) |
| 20 | 1.51 | 2.36 | 3.88 | 4.81 | 5.41 | 5.70 | 5.62 | 5.15 |
| | (1.31) | (2.05) | (3.37) | (4.18) | (4.70) | (4.95) | (4.89) | (4.48) |

Unit in kg/mm$^2$. Values in brackets show ratios to compressed powder as 1

[Relation between Particle-Diameter Upper Limit of Granular Compound and Dimensional Accuracy of Thin-Arc-Shaped Compressed Powder]

Figure 2:
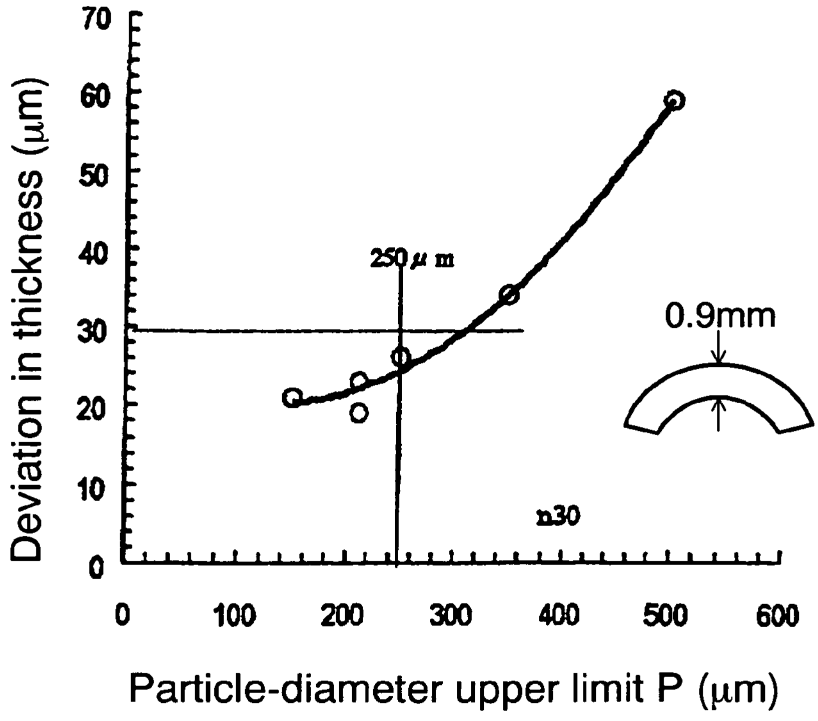
FIG. 2 is a graph showing a relation between dimensional accuracy of arc-shaped magnet and a particle-diameter upper limit of granular compound.

FIG. 2 is a graph, in which deviation in thickness of arc-shaped compressed powder are plotted for each particle-diameter upper limit after heated to cure for 2 min. at 160° C. Compressed powder is formed of 100 parts by weight of granular compound, having particle-diameter upper limit of 500, 350, 250, 212 and 150 μm respectively, using bisphenol type epoxy oligomer (melting point: 95–105° C.) to which 0.2 parts by weight of calcium-stearate is added.

Where, magnet dimensions are outer radius of 3.65 mm, inner radius of 3.55 mm, the maximum thickness of 0.90 mm and length of 15.5 mm.

After molding die cavity is filled with granular compound, molding die is raised up over the thickness (1.75 mm) of whole arc-shaped magnet to make granular compound sink into molding die cavity, which is so-called under-filling operation in powder molding. Then the granular compound is compressed by 8 ton/cm$^2$ to form a compressed powder. Furthermore, the compressed powder is released from molding die while keeping held by upper and bottom punches. A curvature dimension of molding die is exactly transferred on the compressed powder, since these dimensions are exactly transferred by preventing rebound action of spring-back, when compressed powder is released in above described powder-molding condition.

Now, deviation range of ±3 Aμm of an arc-shaped magnet thickness and particle-diameter upper limit P of a granular compound are in the relation of following equation (the correlation coefficient of regression is 0.988).

$$A=0.0003P^2-0.0718P+24.745$$

As is clear from the figure and regression equation, if a particle-diameter upper limit of a granular compound is not more than 250 μm, thickness deviation of the thin-arc-shaped magnet with a wall thickness of less than 1 mm will become not more than ±30 μm or even not more than ±26 μm. The technical problem pointed out by JPO6-236807, i.e., the difficulty of uniform filling of the magnet powder (or the granular compound in the present invention) into molding cavity, is solved by the present invention.

On the other hand, as an example for comparison, a thin-arc-shaped magnet having the same dimensions is manufactured by the same method indicated by JPO6-236807, as follows:

(1) kneading magnetic compound composed of 5 weight % of 12-nylon and 95 weight % of magnet powder whose particle diameter is less than 150 μm as the same particle diameter as disclosed in this invention, at 260° C., (2) forming a pellet using the magnetic compound, (3) manufacturing a thin-arc-shaped magnet using the pellet, setting the molding die head temperature at 175° C., which is below the melting point of 12-Nylon, by extrusion molding method.

The deviation in thickness at the maximum thickness potion of 0.9 mm is ±30 μm. Consequently, according to the present invention, a thin-arc-shaped magnet with equal or higher dimensional accuracy than extrusion molding can be manufactured by powder molding, which is once denied due to a difficulty in the above Publication.

[Weighing Accuracy for Continuous Powder Molding]

Figure 3:
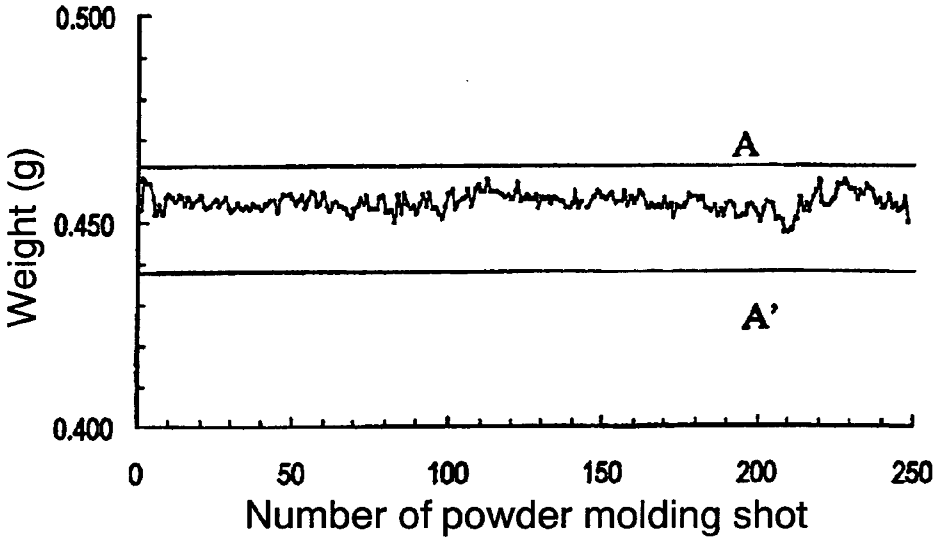
FIG. 3 is a graph showing a weight change of compressed powder of continuous powder molding production.

FIG. 3 is a graph, in which weights of arc-shaped compressed powder are plotted for 250 times continuous powder molding production at each molding shot. The compressed powder is formed of 100 parts by weight of granular compound, having particle-diameter upper limits of 250 μm, using bisphenol type epoxy oligomer (melting point: 95–105° C.) to which 0.2 parts by weight of calcium-stearate is added.

Where the magnet dimensions are outer radius of 3.65 mm, inner radius of 3.55 mm, the maximum thickness of 0.90 mm and length of 15.5 mm. After a molding-die-cavity is filled with granular compound, the molding die is raised up over the thickness (1.75 mm) of whole arc-shaped magnet to make granular compound sink into the molding-die-cavity, which is so-called under-filling operation in powder molding. Then the granular compound is compressed by 8 tons/cm$^2$ to form compressed powder. Furthermore, the compressed powder is released from the molding die while keeping held by upper and bottom punches.

In the figure, straight lines A and A' show 0.4636 g and 0.4379 g respectively, which correspond to weight threshold values of ±30 μm deviation for the maximum thickness of 0.9 mm of arc-shaped magnet. Actual weighing shows the maximum value of 0.461 g, the minimum value of 0.448 g, resulting in only 13 mg of difference. In other words, it is obvious that thin-arc-shaped magnet of under 1 mm thickness can be manufactured in a stable condition in industrial volume by powder molding method of the present invention.

[Magnetic Characteristics of Magnet]

Figure 4:
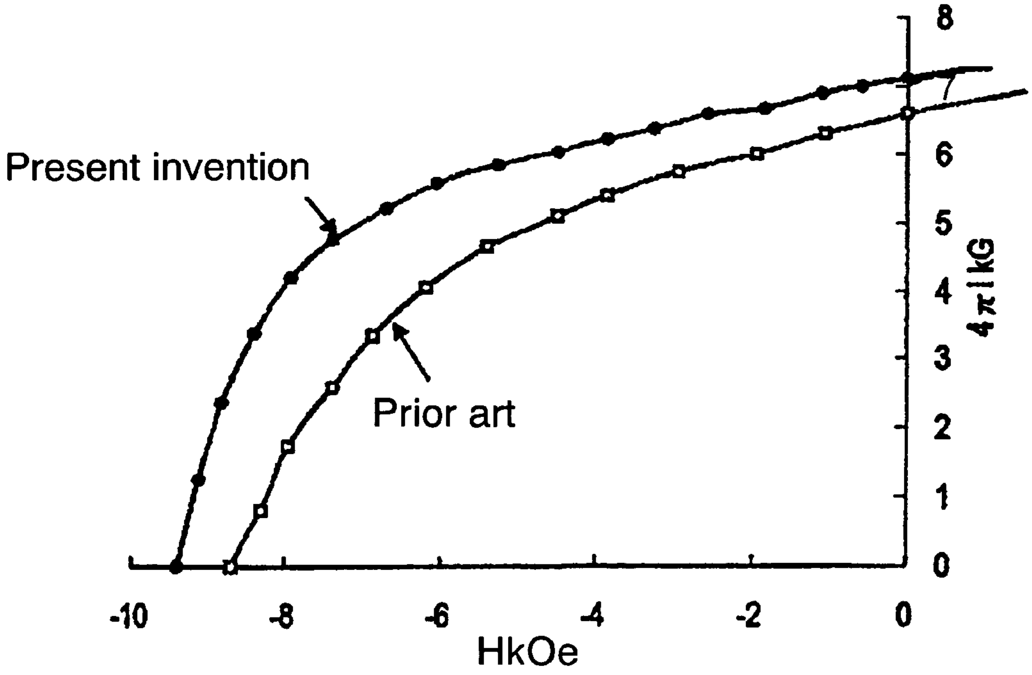
FIG. 4 is a graph showing a demagnetization curve of magnets.

A rare earth-iron bond magnet having a cylindrical shape of 5 mm in diameter and 5 mm length is provided by powder molding a compressed powder, pressed by 8 tons/cm$^2$ followed by a heat-treatment for 2 minutes at 160° C. The compressed powder is formed of 100 parts by weight of granular compound, having particle-diameter upper limits of 250 μm, using bisphenol type epoxy oligomer (melting point: 95–105° C.) to which 0.2 parts by weight of calcium-stearate is added. Then, applying pulse magnetization of 50 kOe in height direction of the cylinder-shaped magnet, a demagnetization curve is obtained using vibration sample-type magnetometer (VSM) at a measurement magnetic-field of ±20 kOe. Further, the extrusion molded magnet is formed by melting and curing the pellet which include 95 weight % of magnet powder and 5 weight % of 12-nylon and is kneaded at 260° C., and the demagnetization curve is also obtained. FIG. 4 is a graph showing the demagnetization curve of so-called compression molded magnet formed of powder molding and heat-treatment of compressed powder of the present invention, and that of the extrusion molded magnet for a comparison. Table 5 shows the magnetic characteristics obtained from the demagnetization curves.

As is obvious from FIG. 4 and Table 5, the embodiment of the present invention shows higher magnetic characteristics compared with the comparative example. Supposedly, this is because high filling ratio of magnet powder is possible in powder molding method of the invention. On the other hand, too finely pulverized and oxidized magnetic material kneaded with a strong shearing force at a high temperature of 260° C. may decrease the magnetic characteristics of the comparative example.

TABLE 5

| | Specific Coercive force Hci kOe | Residual magnetization 4 πIr kG | Maximum energy product [BH]max MGOe | Squareness Hk |
|---|---|---|---|---|
| Present invention | 9.53 | 6.87 | 9.55 | 2.59 |
| Comparative Example | 8.66 | 6.58 | 8.30 | 2.24 |

[Advantages of Arc-Shaped Magnet with a Plurality of Sectional Shapes Longitudinally]

An extrusion molding method as disclosed in JP 06-236807 can not provide an arc shaped magnet with a plurality of sectional shapes longitudinally. However, a thin-arc-shaped magnet used as a field magnet for a small DC motor, the subject of this invention aiming, is required to apply strong static magnetic field in a gap between the field magnet and an armature to satisfy both down-sizing and higher power output of a motor. On the other hand, cogging torque must be low enough for an armature to rotate smoothly. Although an armature having portions of different diameters may be one solution to lower the cogging torque, it will result in increasing an operating current easily by magnetic saturation in an iron core.

Figure 5:
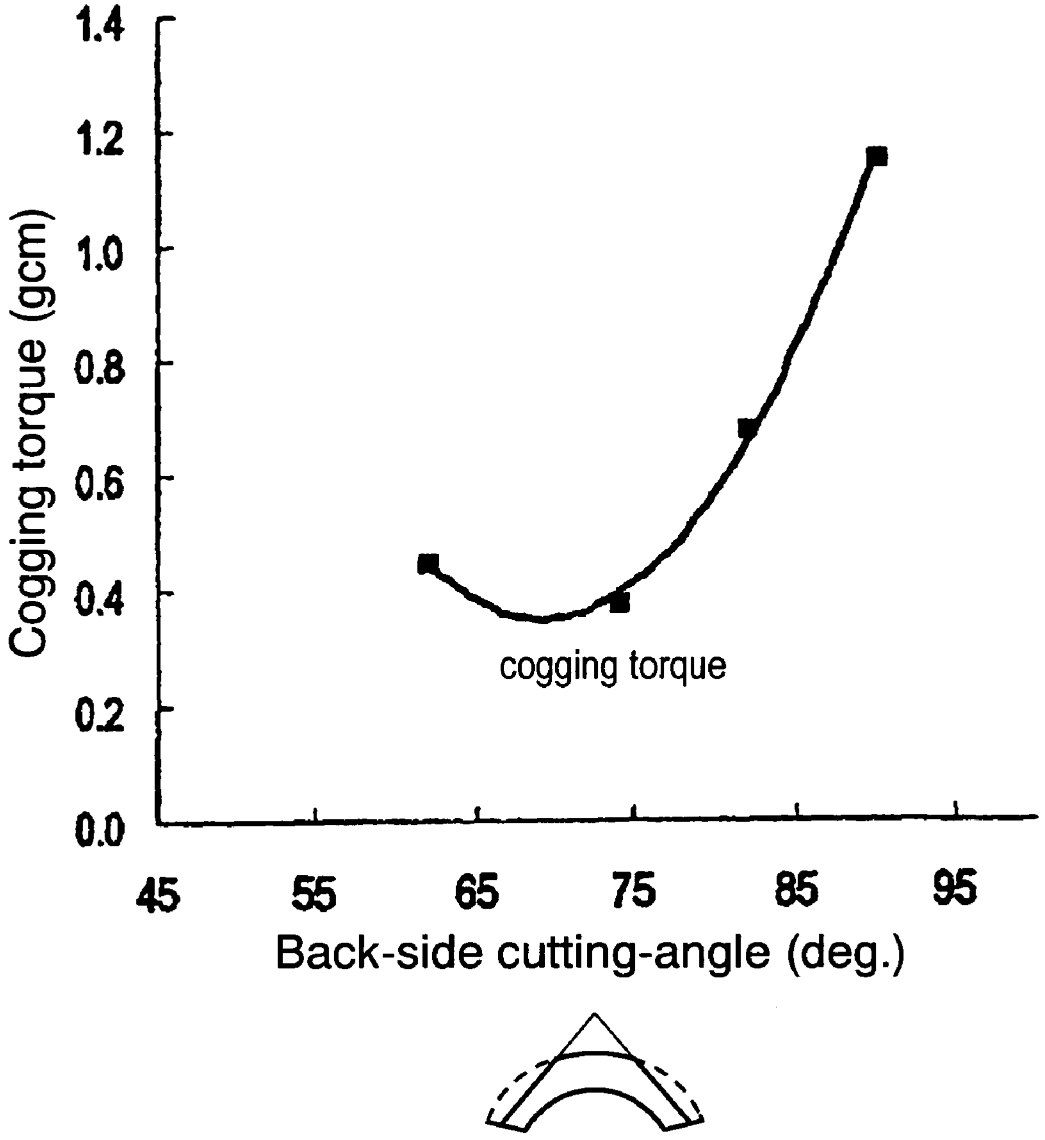
FIG. 5 is a graph showing a relation between a back-side cutting angle and cogging torque.

A powder molding, therefore, of the present invention, can provide an arc-shaped magnet with more than two kinds of sectional shapes longitudinally by designing an upper and a lower punches arbitrarily. With such a magnet, magnetic resistance in magnetic pole surface can be varied with respect to a rotating direction of an armature, and cogging torque can be reduced by shaping a molded magnet appropriately. FIG. 5 shows a relation between a back-side cutting-angle and cogging torque of an arc-shaped magnet where a part of outer surface of the magnet has a cut portion.

INDUSTRIAL APPLICABILITY

The present invention provides a method of manufacturing a thin-arc-shaped magnet having a thickness of less than 1 mm, with high dimensional accuracy and magnet density. The magnet provides, for example, a gap between a field magnet and an armature of a small DC motor with strong static magnetic field. Of course, it is needless to say that the present invention can be applied for various shapes of magnet other than a thin-arc-shaped magnet with a thickness of less than 1 mm.

What is claimed is:

1. A method for manufacturing an arc-shaped rare earth-iron bond magnet having a weight of not more than 0.5 g and a thickness of less than 1 mm, the method comprising the steps of:

(1) grinding rare earth-iron melt-spun flakes to a diameter not greater than 150 μm;

(2) forming a granular compound by blending the rare earth-iron melt-spun flakes not greater than 150 μm in diameter with an epoxy oligomer and a stabilized isocyanate curing agent;

(3) grinding and classifying the granular compound to have a particle diameter of less than 250 μm;

(4) dry blending the granular compound having a particle diameter of less than 250 μm with fatty acid metallic soap powder;

(5) compressing a powder comprising the blend of the granular compound and the fatty acid metallic soap powder in a an arc-shaped mold to form a compressed powder; and (6) heat-treating the compressed powder to form the arc-shaped rare earth-iron bond magnet having a weight of not more than 0.5 g and a thickness of less than 1 mm.

2. The method according to claim 1, wherein the rare earth-iron melt-spun flakes are produced by coarse grinding using a Henschel mixer.

3. The method according to claim 1, wherein the rare earth-iron melt-spun flakes comprise a $RE_2TM_{14}B$ phase having single domain-critical sizes of not more than 300 nm, wherein RE represents Nd or Pr and TM represents Fe or Co, the flakes having a specific coercive force Hci of 8–10 kOe and a residual-magnetization of 7.4–8.6 kG.

4. The method according to claim 1, wherein the epoxy oligomer is a bisphenol epoxy oligomer with a softening point of 85–95° C.

5. The method according to claim 1, wherein the stabilized isocyanate curing agent is composed of one mole of 4-4' diphenylmethane diisocyanate and two moles of methyl-ethyl-ketone oxime.

6. The method according to claim 1, wherein the fatty acid metallic soap powder is calcium stearate powder having a particle diameter of not more than 75 μm.

7. The method according to claim 1, wherein 0.2–0.5 parts by weight of the fatty acid metallic soap powder is dry blended with 100 parts by weight of the granular compound to produce the powder which is compressed.

8. The method according to claim 1, wherein the blend of the granular compound and the fatty acid metallic soap powder has an apparent density of 2.7–3.0 $g/cm^3$ and a powder fluidity of 40–45 sec/50 g.

9. The method according to claim 1, wherein the compressed powder is heated for not less than 2 minutes at 160–200° C.

10. The method according to claim 1, wherein the arc-shaped magnet has a plurality of arc-shaped sectional shapes longitudinally.

11. The method according to claim 1, wherein the mold includes upper and bottom punches for holding the magnet.

12. The method according to claim 1, wherein the powder is filled in a mold cavity by volume weighing before compression.

13. A rare earth-iron bond magnet produced by the method according to claim 1.

14. A small DC motor comprising an arc-shaped magnet produced by the method of claim 1, said magnet having a weight of not more than 0.5 g and a thickness of less than 1 mm, wherein said magnet is produced by the steps of:

(1) grinding rare earth-iron melt-spun flakes to a diameter not greater than 150 μm;

(2) forming a granular compound by blending the rare earth-iron melt-spun flakes not greater than 150 μm in diameter with an epoxy oligomer and a stabilized isocyanate curing agent;

(3) grinding and classifying the granular compound to have a particle diameter of less than 250 μm;

(4) dry blending the granular compound having a particle diameter of less than 250 μm with fatty acid metallic soap powder;

(5) compressing a powder comprising the blend of the granular compound and the fatty acid metallic soap powder in an arc-shaped mold to form a compressed powder; and (6) heat-treating the compressed powder to form the arc-shaped rare earth-iron bond magnet having a weight of not more than 0.5 g and a thickness of less than 1 mm.

* * * * *